United States Patent
Lesartre et al.

(10) Patent No.: US 11,197,152 B2
(45) Date of Patent: Dec. 7, 2021

(54) UTILIZATION OF COMPONENT GROUP TABLES IN A COMPUTING NETWORK

(71) Applicant: HEWLETT PACKARD ENTERPRISE DEVELOPMENT LP, Houston, TX (US)

(72) Inventors: Gregg B. Lesartre, Fort Collins, CO (US); Gary B. Gostin, Plano, TX (US); Nicholas McDonald, Fort Collins, CO (US)

(73) Assignee: Hewlett Packard Enterprise Development LP, Houston, TX (US)

(*) Notice: Subject to any disclaimer, the term of this patent is extended or adjusted under 35 U.S.C. 154(b) by 63 days.

(21) Appl. No.: 16/712,554

(22) Filed: Dec. 12, 2019

(65) Prior Publication Data

US 2021/0185516 A1 Jun. 17, 2021

(51) Int. Cl.
*H04W 8/26* (2009.01)
*H04L 29/12* (2006.01)

(52) U.S. Cl.
CPC ............. *H04W 8/26* (2013.01); *H04L 61/103* (2013.01); *H04L 61/2007* (2013.01); *H04L 61/6004* (2013.01); *H04L 61/6068* (2013.01)

(58) Field of Classification Search
None
See application file for complete search history.

(56) References Cited

U.S. PATENT DOCUMENTS

| | | | | |
|---|---|---|---|---|
| 7,010,607 B1* | 3/2006 | Bunton | ..................... | H04L 1/18 709/228 |
| 2004/0133626 A1* | 7/2004 | Herrero | ............... | H04L 63/0272 709/200 |
| 2014/0105215 A1* | 4/2014 | Mogul | ................ | H04L 49/3009 370/395.32 |
| 2014/0325211 A1* | 10/2014 | Stransky | ............. | H04L 61/2076 713/162 |

* cited by examiner

*Primary Examiner* — Kenny S Lin
(74) *Attorney, Agent, or Firm* — Hewlett Packard Enterprise Patent Department

(57) ABSTRACT

A component group table in a receiving node of a computer network stores access permission information for enabling the receiving node to validate an access request issued by a requesting node. An incoming access request at a receiving node includes a subnet ID/component ID ("SID/CID") tuple. The receiving node selectively computes a component group table address for the requesting node according to an address mapping function determined by the value of at least one predetermined bit within the SID/CID tuple of the incoming access request. Using at least one bit in the SID/CID tuple enables the establishment of at least two address mapping regions in the component group table, such as separate regions for storage nodes and compute nodes in the network.

20 Claims, 6 Drawing Sheets

UTILIZATION OF COMPONENT GROUP TABLES IN A COMPUTING NETWORK

BACKGROUND

Large-scale, high-performance computing systems, including exascale computing systems, route traffic between potentially thousands or tens of thousands of nodes in a system. Security of nodes within a high-performance computing system may be protected with a hardware component group table implemented in each node. The component group table of a node identifies other nodes which may access the node, and what kind of access is allowed.

BRIEF DESCRIPTION OF THE DRAWINGS

The present disclosure is best understood from the following detailed description when read with the accompanying drawings. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
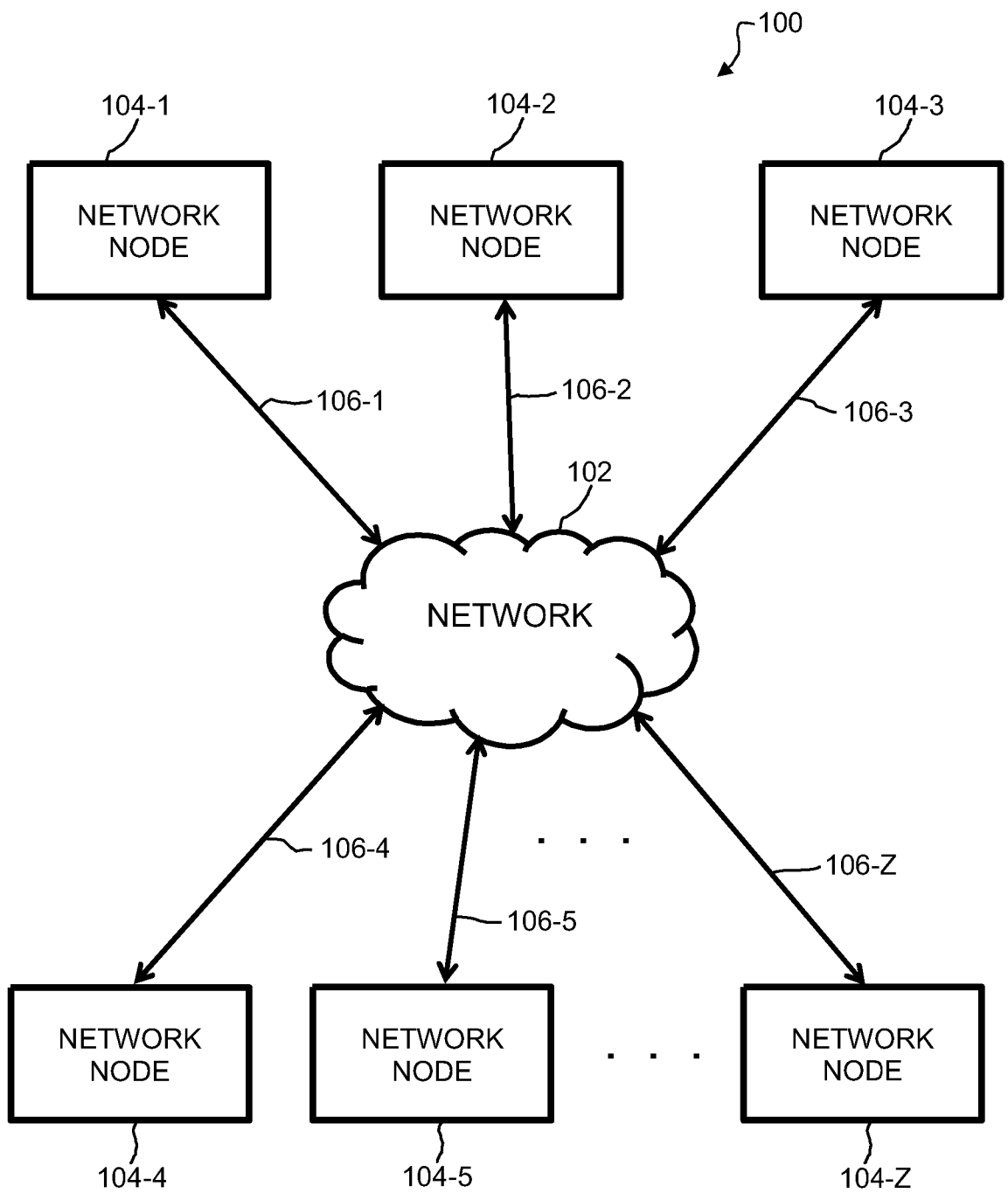
FIG. 1 is a block diagram of a computing system, according to one or more examples of the disclosure.

Illustrative examples of the subject matter claimed below will now be disclosed. In the interest of clarity, not all features of an actual implementation are described in this specification. It will be appreciated that in the development of any such actual implementation, numerous implementation-specific decisions may be made to achieve the developers' specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

Further, as used herein, the article "a" is intended to have its ordinary meaning in the patent arts, namely "one or more." Herein, the term "about" when applied to a value generally means within the tolerance range of the equipment used to produce the value, or in some examples, means plus or minus 10%, or plus or minus 5%, or plus or minus 1%, unless otherwise expressly specified. Further, herein the term "substantially" as used herein means a majority, or almost all, or all, or an amount with a range of about 51% to about 100%, for example. Moreover, examples herein are intended to be illustrative only and are presented for discussion purposes and not by way of limitation.

As used herein, the term "network topology" (or "topology") refers to the arrangement of network elements, such as network nodes and network links, in a computing or communications network. The term "network fabric" (or "fabric") refers generally to a network topology in which network nodes interconnect via one or more network switches, such as crossbar switches, network hubs, data routers, and other data transport elements to distribute network traffic across multiple physical links.

As previously noted, large-scale, high-performance computing systems may include an interconnected network of thousands or tens of thousands of individual nodes, including, for example, computing nodes, storage nodes, control nodes, and the like. A computer network, in turn, may be logically divided into a plurality of subnetworks, or subnets. The membership of a particular network node within a particular subnet may be determined by the network node's network address, such as an Internet Protocol ("IP") address in a TCP/IP network or a Global Component Identifier ("GC") in a Gen-Z network. For example, certain bits of a network node's address may serve as a subnet identifier for the node.

Efficient operation of large-scale computing systems requires a fabric which supports the efficient routing of data traffic between network nodes. A component group table may be maintained in each node of a computing system to facilitate maintaining the security of the system. A component group table may be maintained in hardware (e.g., semiconductor memory) associated with each node in a network. As the scale of a network increases, so too does the amount of memory necessary to be provided in each node for maintaining a component group table. That is, the maintenance of component group tables in hardware for high-performance computing system nodes consumes valuable semiconductor area.

A predetermined subset of each network node's address (e.g., the most significant N bits of an address) may be a subnet identifier ("SID") having a predetermined number of bits, with other bits of each node's address serving as a component identifier ("CID") within the subnet identified by the SID. The address may in such cases considered to comprise an "SID/CID tuple."

In such cases, the number of subnets in a network may be limited by the number of bits used as the SID in the SID/CID tuple, or the equivalent number of bits in an address such as the aforementioned GC. If N bits within an address are so designated, then the network may contain at most $2^N$ subnets. For an M-bit address containing an N-bit subnet identifier (N<M), therefore, each of the up to $2^N$ subnets may each contain a maximum of $2^{(M-N)}$ separate components, i.e., separately addressed network nodes.

In some cases, a network may include subnets having disparate numbers of individual components. If one or more subnets have significantly fewer components than other subnets, there may be an inefficiency in the address space usage for the network as a whole, since a larger number of unique CIDs in the address space for some subnets may remain unused. On the other hand, for a subnet containing a much larger number of individual components, the number of bits reserved as the CID of an address may present a limitation to the size of the subnet. That is, in a network topology that does not use all of the CIDs within each subnet, the use of a fixed SID/CID tuple to identify a component may leave a large number of entries in a component group table unused, thereby resulting in a maximum supportable overall network size that may be limited to fewer nodes than required to reach desired targets for some system fabric topologies.

In examples described herein, a component group table in a first node of a large-scale network stores access permission information for enabling the first node to validate an access request issued to the first node by a second (requesting) node. In some examples, a receiving node (i.e., a network node receiving an access request) may only execute or service the request upon validation of access permission of the requesting node by reference to the requesting node's access permission information maintained in the receiving node's component group table. A received access request at the receiving node includes the SID/CID tuple of the second (requesting) node. The receiving node selectively computes a component group table address for the requesting node by, for example, determining whether the SID of an SID/CID tuple is above or below a predetermined threshold value, or by evaluating a predetermined bit within the SID of an SID/CID tuple in the incoming access request. In this way, the SID/CID tuple may enable the establishment of two "regions" of subnets, such as separate subnets for storage nodes and compute nodes in the network.

Referring to FIG. 1, there is shown a block diagram showing the topology of a large-scale network system 100 in accordance with one or more examples. Network system 100 may include a network 102 including numerous networking sub-elements, such as routers, switches, servers, and the like (not separately shown) providing interconnectivity between a plurality of network nodes 104-1 ... 104-Z. In the example of FIG. 1, a plurality of network nodes 104-1 ... 104-Z are shown coupled to and interconnected by network 102.

In the topology of the example system 100 of FIG. 1, each network node 104-1 ... 104-Z may be a member of one of a plurality of individual subnets, i.e., each node's address may include some number N of subnet identifier (SID) bits and some number M of component identifier (CID) bits. Each node 104-1 ... 104-Z is coupled to network 102 by a respective network connection 106-1 ... 106-Z, as shown in FIG. 1. Each connection 106-1 ... 106-Z may be implemented as one or more than one interfaces and or links.

Figure 2:
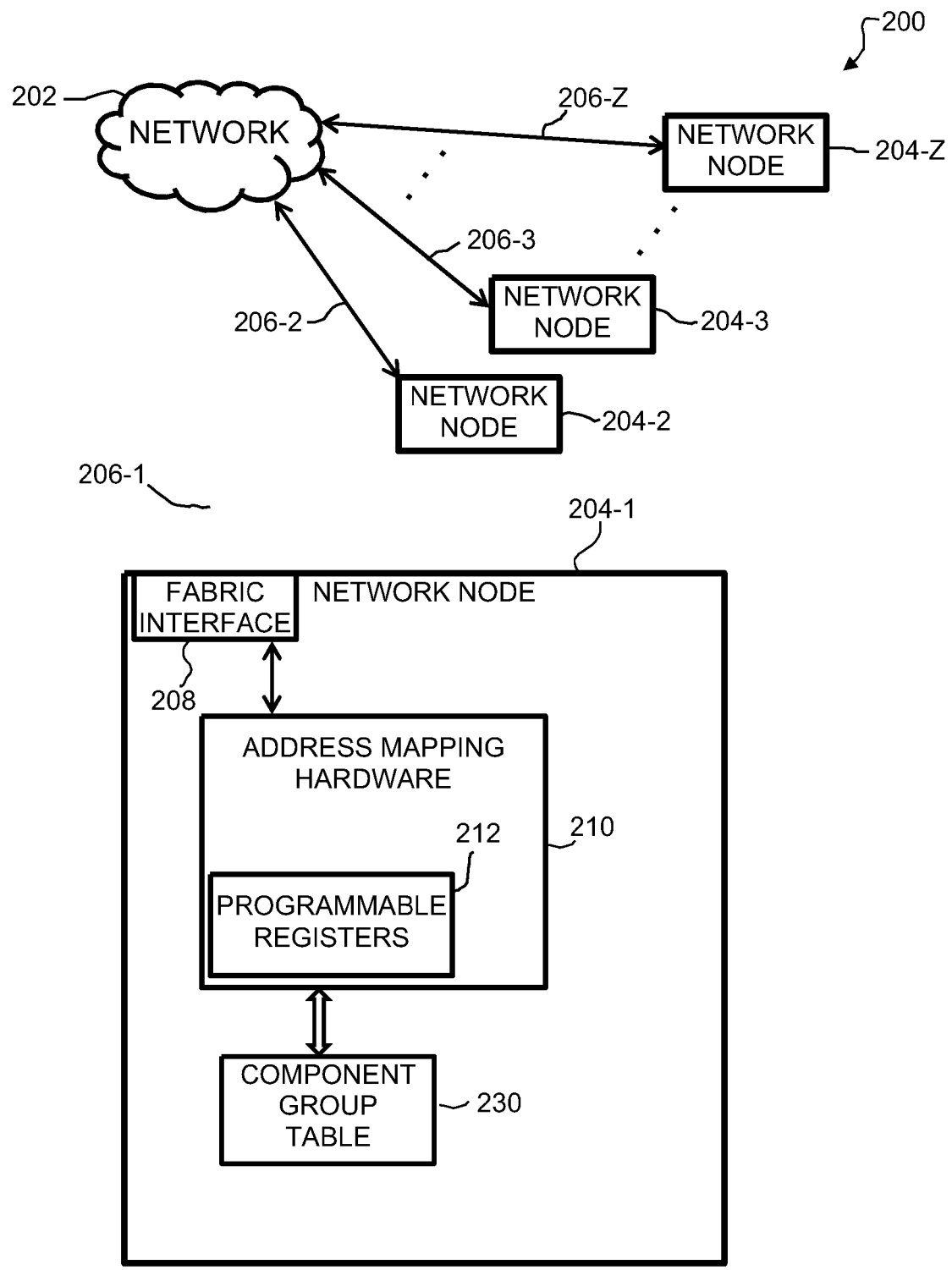
FIG. 2 is a block diagram of a portion of a computing system such as the computing system of FIG. 1, according to one or more examples of the disclosure.

FIG. 2 is a block diagram of an example network system 200 including a network 202 and a plurality of network nodes 204-1 ... 204-Z coupled to network 202 via respective network connections 206-1 ... 206-Z. Network node 204-1 is shown in greater detail in FIG. 2; it is to be understood that the description of network node 204-1 is applicable to each network node 204-1 ... 204-Z in this example.

As shown in FIG. 2, network node 204-1 may include a fabric interface, in this example, a fabric interface 208, such as a network interface controller ("NIC") of an Ethernet network, for providing network communication between network node 204-1 and network 202 over the network link 206-1. In addition, network node 204-1 includes address mapping hardware 210 for implementing functionality of network node 204-1 as defined by instructions stored in a memory 212 as described herein. Address mapping hardware 210 may be implemented in various forms, such as with dedicated logic, application-specific integrated circuits ("ASICs"), microprocessors, microcontrollers, or combinations thereof. Address mapping hardware 210 may include one or more programmable registers 212 for storing configurable parameters as described herein. Programmable registers 212 may be variously implemented using one or more of various types of memory, including semiconductor memory such as dynamic random access memory (DRAM).

A memory unit 230 in a network node such as network node 204-1 may store a component group table. Component group table 230 may be provided to identify other nodes 204-2 ... 204-Z which may communicate with node 204-1, and to determine what kind of communication is allowed. Each node 204-1 ... 204-Z in network system 200 may maintain its own component group table 230.

In some examples, a component group table 230 such as that maintained by each node 204-1 ... 204-Z may store access permission information specifying whether a network node has permission to respond to an access request from a requesting node. When a requesting node's identifier tuple is mapped to an entry in a receiving node's component group table, the receiving node may then selectively respond to a request from a requesting node based on the access permission information stored at the receiving node's component group table entry.

As will be appreciated, as the size of (i.e., number of nodes in) a network system such as system 200 of FIG. 2 increases, so too will the amount of memory necessary in each node for storing a component group table 230 correspondingly increase. In the example of FIG. 2, each network node 204-1 ... 204-Z is uniquely identified by an SID/CID tuple or its equivalent. In some examples, the tuple may comprise 22 bits, with 10 bits for the SID and 12 bits for the CID. CIDs used within a given subnet may be contiguous, starting from zero. In such examples, a component group table may support up to $2^{17}$ total unique network nodes (components) in a network. Similarly sparse subnets may be compressed to allow for a greater number of subnets within a tuple of a given size. In this example, for instance, it is not necessary to implement a component group table having $2^{22}$ entries despite the SID/CID tuples having 22 bits.

In some examples herein, a component group table such as component group table 230 in node 204-1 may be segregated into two regions, for example, HIGH and LOW, as distinguished by a configured SID value of the SID/CID tuple. In other examples, a component group table may be segregated into more than two regions, for example, four, eight, or more, depending upon the number of SID region thresholds designated.

Figure 3:
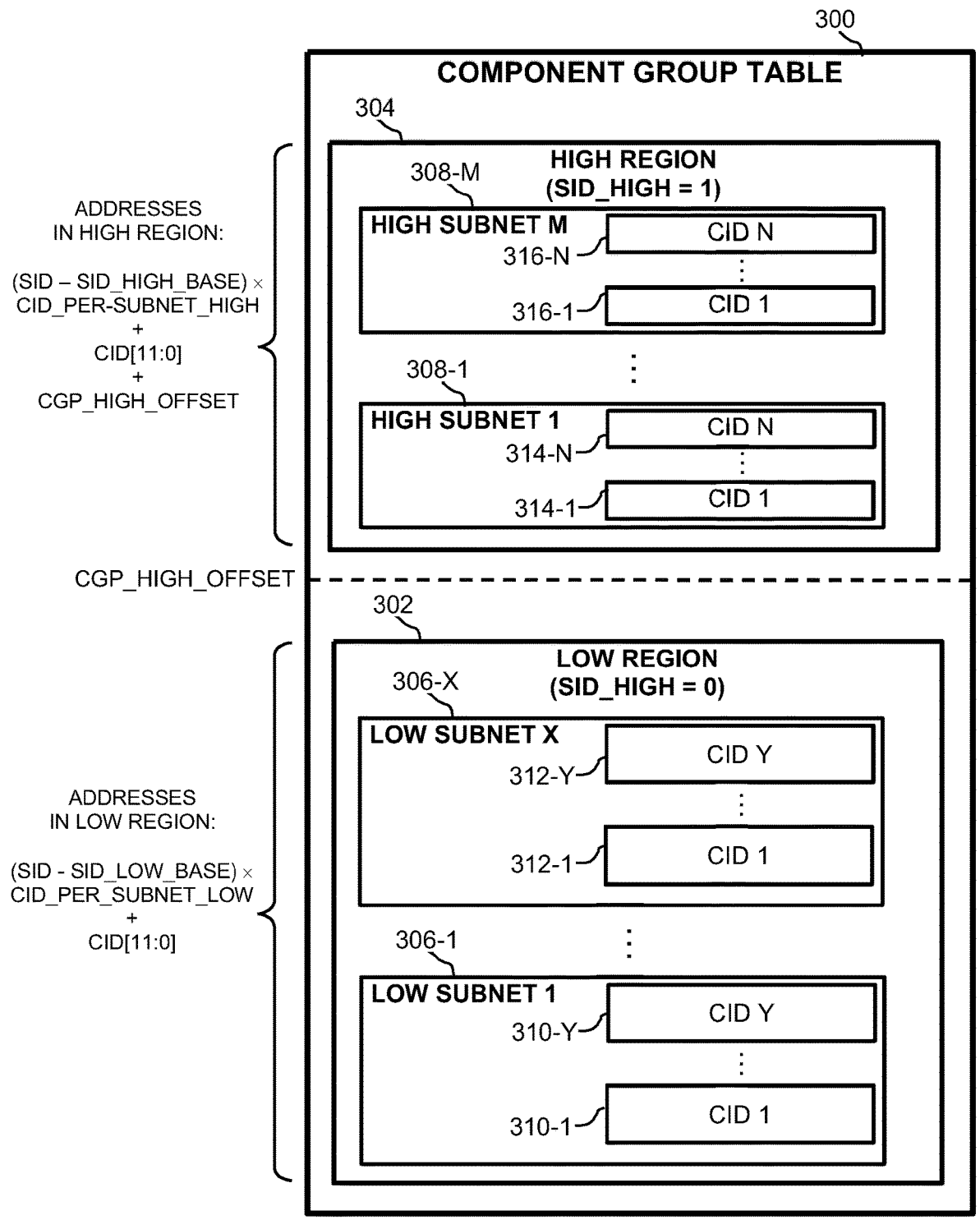
FIG. 3 is a block diagram of a component group table maintained by a node in a computing system such as the nodes of the computing systems in FIG. 2, according to one or more examples of the disclosure.

Referring now to FIG. 3, there is shown a block diagram of a component group table 300, such as the component group table 230, that may be maintained by a node in a network system, such as node 204-1 in system 200 from FIG. 2. As described herein, component group table 300 in the example of FIG. 3 may be stored in semiconductor on-die memory, such as SRAM or DRAM, providing fast data retrieval to support high-speed operation of an overall network system of which the network node is a part.

Component group table 300 shown in FIG. 3 represents an example implementation in which the component group table 300 is segregated into two regions, a low region 302 and a high region 304. In the example of FIG. 3, each region 302 and 304 is organized according to a separate address mapping function determined by examining the SID of the identifier tuple. Thus, if the SID of an identifier tuple received from a requesting network node is within a first value range, a first address mapping function is applied to compute a component group table address for the requesting node within a first address range of component group table 300, and if the SID of the identifier tuple is within a second value range, a second address mapping function is applied to compute a component group table address for the requesting node within a second address range of component group table 300.

In the example of FIG. 3, the component group table address CGP_HIGH_OFFSET represents the boundary between low region 302 and high region 304 in component group table 300. CGP_HIGH_OFFSET may be chosen to allow for a different maximum number of components in a second subnet region, with each subnet in low region 302 having a first maximum number of components and each subnet in high region 304 having a second maximum number of components. In this way, subnet/component pairings may be defined to avoid undesirable sparseness within a component group table.

As noted, in other examples, more than one region bit may be defined within the SID of an identifier tuple, such that more than two separate mapping functions may be defined for addresses within the component group table. For example, if two region bits are defined in an SID tuple, the binary value of the two region bits (00, 01, 10, or 11) may be used to select one of four different mapping functions.

With continued reference to FIG. 3, in which a single region bit is defined for identifier tuples, one of two separate address mapping functions is identified in each identifier tuple. In the example of FIG. 3, a bit SID_HIGH is defined as the region bit for an identifier tuple. SID_HIGH may be, for example, the most significant bit, of the SID field of each identifier tuple. Thus, in the example of FIG. 3, if the region bit of an identifier tuple received from a requesting node is binary "0", this identifies low region 302, for which the address mapping function may be defined as follows:

$$LOW\text{REGION (302) ADDRESS}=(SID\text{-}SID\_LOW\_BASE) \times CID\_PER\_SUBNET\_LOW+CID[11:0]$$

where SID_LOW specifies the base SID value of region 302 and CID_PER_SUBNET_LOW specifies the maximum number of CIDs per SID in the low region 302, and is used to minimize sparseness in low region 302. CID[11:0] refers to the twelve least significant digits of the CID in an identifier tuple.

On the other hand, if the region bit of an identifier tuple received from a requesting node is a binary "1", this identifies high region 304, for which a different address mapping function may be defined as follows:

$$\text{HIGH REGION (304) ADDRESS}=(SID\text{-}SID\_HIGH\_BASE) \times CID\_PER\_SUBNET\_HIGH+CID[11:0]+CGP\_HIGH\_OFFSET$$

where SID_HIGH_BASE specifies the base SID value for region 304, and CID_PER_SUBNET_HIGH specifies the number of CIDs per SID in the high region 304, and is used to minimize sparseness in high region 304. CGP_HIGH_OFFSET identifies the base component group table address for the high region. Again, CID[11:0] refers to the twelve least significant digits of the CID in an identifier tuple.

As shown in FIG. 3, the separate mapping functions defined for low region 302 and high region 304 of component group table 300 enables low region 302 to accommodate a first plurality 1 . . . X of subnets each having up to a first plurality 1 . . . Y of components, while high region 304 may accommodate a second plurality 1 . . . M of subnets each having up to a second plurality 1 . . . N of components. The different first and second pluralities of subnets, and components established by configuring values for the implementation-specific variables CGP_HIGH_OFFSET, CID_PER_SUBNET_LOW and CID_PER_SUBNET_HIGH, permits regions 302, 304 to be defined to accommodate different classes of subnets, for example, computing subnets and memory subnets, characterized by different relative subnet/component proportions. The respective value of the CGP_HIGH_OFFSET may be independently selected, provided that the combination of CGP_HIGH_OFFSET, CID_PER_SUBNET_LOW and CID_PER_SUBNET_HIGH are collectively consistent to avoid configuration more entries than are available in the component group table or to map SIDs from the low and high regions to the same table entry. This allows for defining the aforementioned implementation-specific variables to minimize overall sparseness of component group table 300.

With address mapping functions as defined in this example, low region 302 of component group table 300 accommodates a first plurality of subnets ranging from low subnet 1, designated with reference numeral 306-1 through low subnet X designated with reference numeral 306-X. Each low subnet 306-1 . . . 306-X accommodates a first plurality Y of components. Low subnet 306-1 accommodates components CID 1 (reference numeral 310-1) through CID Y (reference numeral 310-Y); low subnet 306-X accommodates components CID 1 (reference numeral 312-1) through CID-Y (reference numeral 312-Y).

High region 304 of component group table 300 accommodates a second plurality of subnets ranging from high subnet 1, designated with reference numeral 308-1 through high subnet M designated with reference numeral 308-M. Each high subnet 308-1 . . . 308-M accommodates a first plurality N of components. High subnet 308-1 accommodates components CID 1 (reference numeral 314-1) through CID N (reference numeral 314-N); High subnet 308-N accommodates components CID 1 (reference numeral 316-1) through CID N (reference numeral 316-N).

Figure 4:
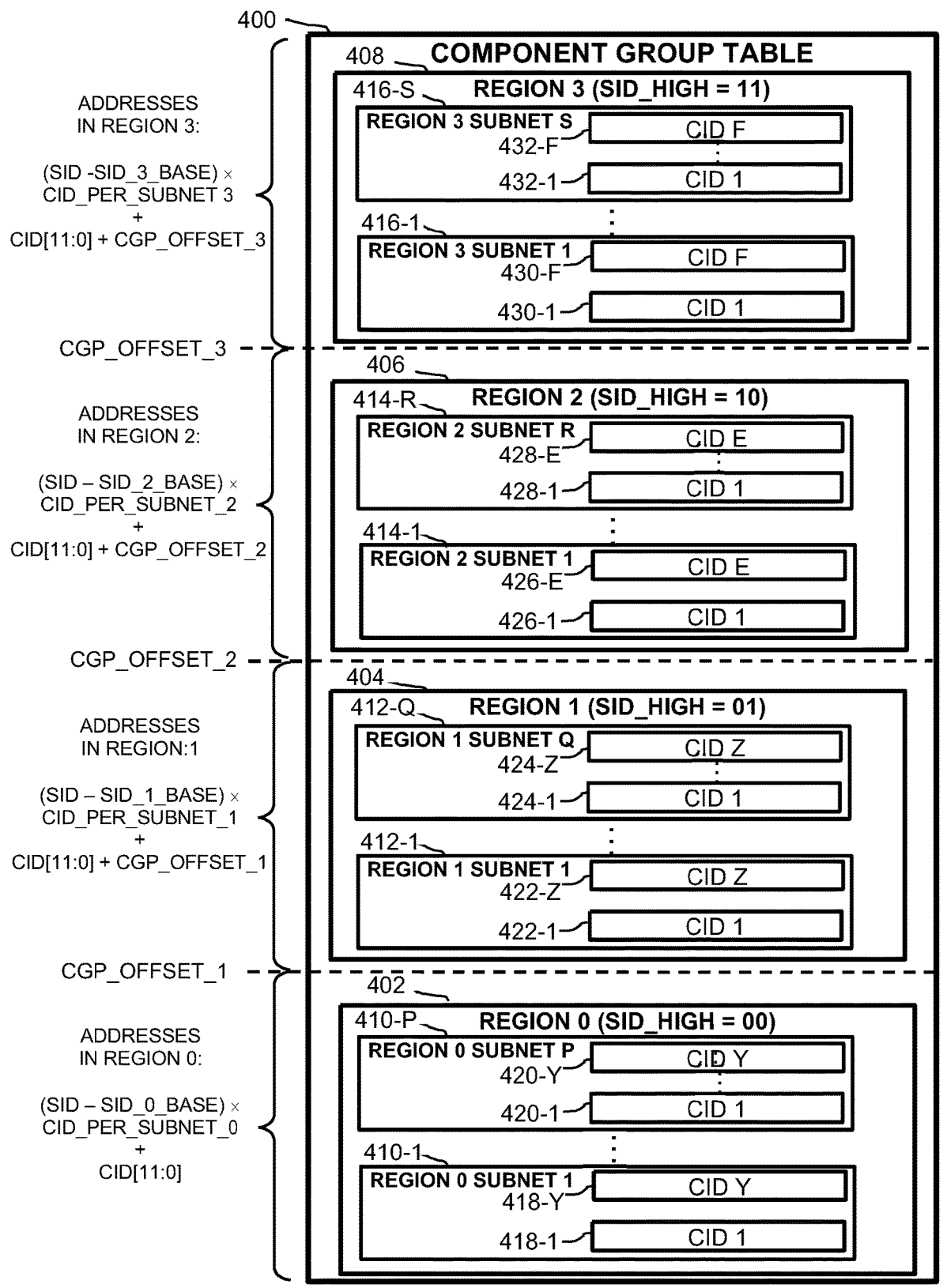
FIG. 4 is a block diagram of a component group table maintained by a node in a computing system such as the nodes of the computing systems in FIG. 2, according to one or more examples of the disclosure.

Referring now to FIG. 4, there is shown a block diagram of a component group table 400, such as the component group table 230, that may be maintained by a node in a network system, such as node 204-1 in system 200 from FIG. 2. As described herein, component group table 400 in the example of FIG. 4 may be stored in semiconductor on-die memory, such as SRAM or DRAM, providing fast data retrieval to support high-speed operation of an overall network system of which the network node is a part.

Component group table 400 shown in FIG. 4 represents an example implementation in which the component group table 400 is segregated into four regions, namely region 0 designated with reference numeral 402, region 1 designated with reference number 404, region 2 designated with reference numeral 406, and region 3 designated with reference numeral 408. In the example of FIG. 4, each region 402, 404, 406, and 408 is organized according to a separate address mapping function determined by examining SID of the identifier tuple. Thus, depending on the value range of the SID of an identifier tuple received from a requesting network node one of four different address mapping function is applied to compute a component group table address for the requesting node within a particular address range of component group table 400, In the example of FIG. 4, the component group table address CGP_OFFSET_1 represents the boundary between region 0 (402) and region 1 (404) in component group table 400. Component group table address CGP_OFFSET_2 represents the boundary between region 1 (404) and region 2 (406), and component group table address CGP_OFFSET_3 represents the boundary between region 2 ( ) 406) and region 3 (408). In this example, the values of CGP_OFFSET_1, CGP_OFFSET_2, and CGP_OFFSET_3 may be chosen to allow for a different maximum number of components in each subnet region, with each subnet in each region having a different maximum number of components. In this way, subnet/component pairings may be defined to avoid undesirable sparseness within a component group table.

With continued reference to FIG. 4, in which two region bits are defined for identifier tuples, one of four separate address mapping functions is identified in each identifier tuple. In the example of FIG. 4, two bits SID_HIGH are defined as the region bit for an identifier tuple. SID_HIGH may be, for example, the most significant two bits of the SID field of each identifier tuple. Thus, in the example of FIG. 4, if the region bits of an identifier tuple received from a requesting node is binary "00", this identifies low region 402, for which the address mapping function may be defined as follows:

REGION 0 (402) ADDRESS=(*SID*–*SID*_0_BASE)× *CID_PER*_SUBNET_0 +*CID*[11:0]

Where SID_0_BASE specifies the base SID value of region 0 and CID_PER_SUBNET_0 specifies the maximum number of CIDs per SID in the region 0 (402), and is used to minimize sparseness in region 0 (402). CID[11:0] refers to the twelve least significant digits of the CID in an identifier tuple.

On the other hand, if the region bits of an identifier tuple received from a requesting node is a binary "01", this identifies region 1 (404), for which a different address mapping function may be defined as follows:

REGION 1 (404) ADDRESS=(*SID*–*SID*_1_BASE)× *CID_PER*_SUBNET_1+*CID*[11:0]+*CGP*_OFFSET_1 where SID_1_BASE specifies the base SID value of region 1 and CID_PER_SUBNET_1 specifies the number of CIDs per SID in region 1 (404), and is used to minimize sparseness in region 1 (404). Again, CID[11:0] refers to the twelve least significant digits of the CID in an identifier tuple.

Similarly, if the region bits of an identifier tuple received from a requesting node is a binary "10", this identifies region 2 (406), for which a different address mapping function may be defined as follows:

REGION 2 (404) ADDRESS=(*SID*–*SID*_2_BASE)× *CID_PER*_SUBNET_2+*CID*[11:0]+*CGP*_OFFSET_2 where SID_2_BASE specifies the base SID value of region 2 and CID_PER_SUBNET_2 specifies the number of CIDs per SID in region 1 (404), and is used to minimize sparseness in region 1 (404). Again, CID[11:0] refers to the twelve least significant digits of the CID in an identifier tuple.

And finally, if the region bits of an identifier tuple received from a requesting node is a binary "11", this identifies region 3 (408), for which a different address mapping function may be defined as follows:

REGION 3 (404) ADDRESS=(*SID*–*SID*_3_BASE)× *CID_PER*_SUBNET_3+*CID*[11:0]+*CGP*_OFFSET_3 where SID_3_BASE specifies the base SID value of region 3 and CID_PER_SUBNET_3 specifies the number of CIDs per SID in region 1 (404), and is used to minimize sparseness in region 1 (404). Again, CID[11:0] refers to the twelve least significant digits of the CID in an identifier tuple.

As shown in FIG. 4, the separate mapping functions defined for regions 0, 1, 2, and 3 (402, 404, 406, and 408, respectively) enables each region to accommodate a different plurality of subnets each having up to a particular plurality components, The different pluralities of subnets, and components established by predefining values for the implementation-specific variables CGP_OFFSET_1, CGP_OFFSET_2, and CGP_OFFSET_3, permits regions 402, 404, 406, and 408 to be defined to accommodate different classes of subnets, for example, computing subnets and memory subnets, characterized by different relative subnet/component proportions. This allows for defining the aforementioned implementation-specific variables to minimize overall sparseness of component group table 400. The respective value of the CGP_OFFSET_1, CGP_OFFSET_2 and CGP_OFFSET_3 may be independently selected, provided that the combination of these values with CID_NUMBER_0, CID_NUMBER_1, CID_NUMBER_2, and CID_NUMBER_3 are collectively consistent to avoid configuration more entries than are available in the component group table.

With address mapping functions as defined in this example, region 0 (402) of component group table 400 accommodates a first plurality of subnets ranging from region 0 subnet 1, designated with reference numeral 410-1 through region 0 subnet P designated with reference numeral 410-P. Each subnet 410-1 . . . 410-P accommodates a first plurality Y of components. Region 0 subnet 410-1 accommodates components CID 1 (reference numeral 418-1) through CID Y (reference numeral 418-Y); region 0 subnet 410-P accommodates components CID 1 (reference numeral 420-1) through CID-Y (reference numeral 420-Y).

Region 1 (404) of component group table 400 accommodates a second plurality of subnets ranging from region 1 subnet 1, designated with reference numeral 412-1 through region 1 subnet Q designated with reference numeral 412-Q. Each region 1 subnet 412-1 . . . 412-Q accommodates a first plurality Z of components. Region 1 subnet 1 (412-1) accommodates components CID 0 (reference numeral 422-1) through CID Z (reference numeral 422-Z); Region 1 subnet Q accommodates components CID 1 (reference numeral 424-1) through CID Z (reference numeral 424-Z).

Similarly, region 2 (406) of component group table 400 accommodates a third plurality of subnets ranging from region 2 subnet 1, designated with reference numeral 414-1 through region 2 subnet R designated with reference numeral 414-R. Each region 2 subnet 414-1 . . . 414-R accommodates a first plurality E of components. Region 2 subnet 1 (414-1) accommodates components CID 1 (reference numeral 426-1) through CID E (reference numeral 462-E); Region 2 subnet R accommodates components CID 1 (reference numeral 428-1) through CID E (reference numeral 428-ZE).

Finally, region 3 (404) of component group table 400 accommodates a second plurality of subnets ranging from region 3 subnet 1, designated with reference numeral 416-1 through region 3 subnet S designated with reference numeral 416-S. Each region 3 subnet 416-1 . . . 416-S accommodates a first plurality F of components. Region 3 subnet 1 (416-1) accommodates components CID 1 (reference numeral 430-1) through CID F (reference numeral 430-F); Region 3 subnet S accommodates components CID 1 (reference numeral 432-1) through CID F (reference numeral 432-F).

In various examples herein, the maintaining of two (or more) regions of a component group table each having a separate address mapping function improves the operation of the network node implementing such a component group table, and further improves the operation of a network of which the network node may be a part. Avoidance of undue sparsity in the storage of access permission information in a network node's component group table increases the efficiency of memory usage, thereby reducing or minimizing the amount of physical memory necessary to accommodate a component group table for a large-scale network. Such minimization of memory capacity is beneficial from the standpoint of device cost as well as power consumption and thermal efficiency.

Figure 5:
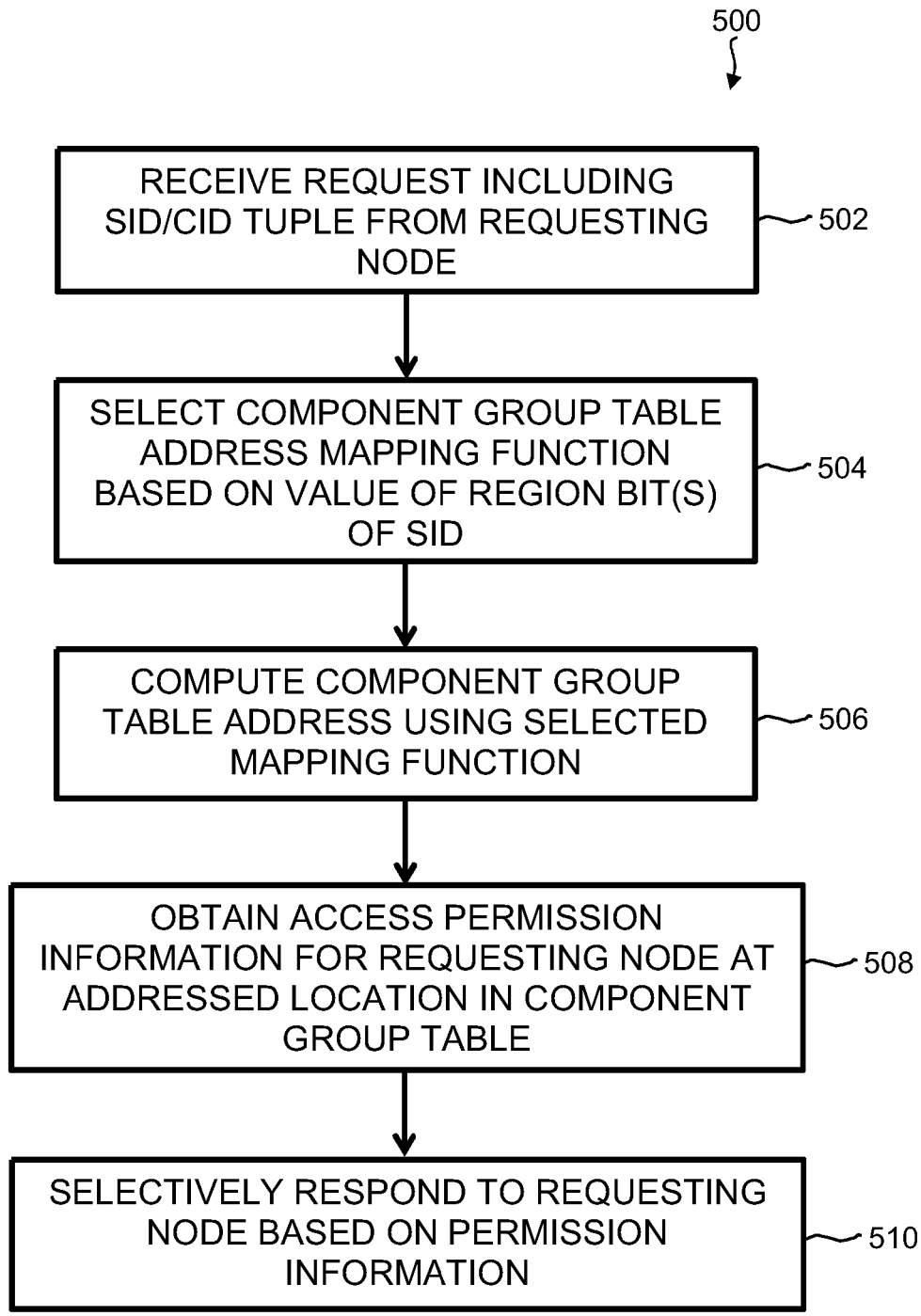
FIG. 5 is a flow diagram of operation of a network node in a computing system according to one or more examples of the disclosure.

Referring to FIG. 5, there is shown a flow diagram 500 of a method of computing a component group table address in a network component in accordance with one or more examples. In this example, in block 502 a receiving node, such as node 204-1 from the example of FIG. 2, receives an access request from a requesting node, which may be any node in a network system such as network system 200 from the example of FIG. 2. The access request received in block 502 includes an SID/CID tuple identifying the requesting device.

In block 504, the receiving node selects a component group table address mapping function based upon the value of one or more region bits in the SID of the SID/CID tuple of the request. As previously described, a single region bit in an SID may be used to define two separate address mapping regions within a component group table; additional bits may allow for additional address mapping regions in a component group table; SID thresholds allow for non-power-of-two number of SIDs in each subnet group.

Once an address mapping function is selected in block 504, in block 506 a component group table address is computed using the SID/CID tuple of the address received in block 502 using the address mapping function selected in block 504.

In block 508, the receiving node obtains the access information for the requesting device stored in the receiving node's component group table at the component group table address computed in block 506. This access permission information enables the receiving node to selectively respond to the request received in block 402 depending upon the access permissions identified in block 508, as represented by block 510 in FIG. 5.

Figure 6:
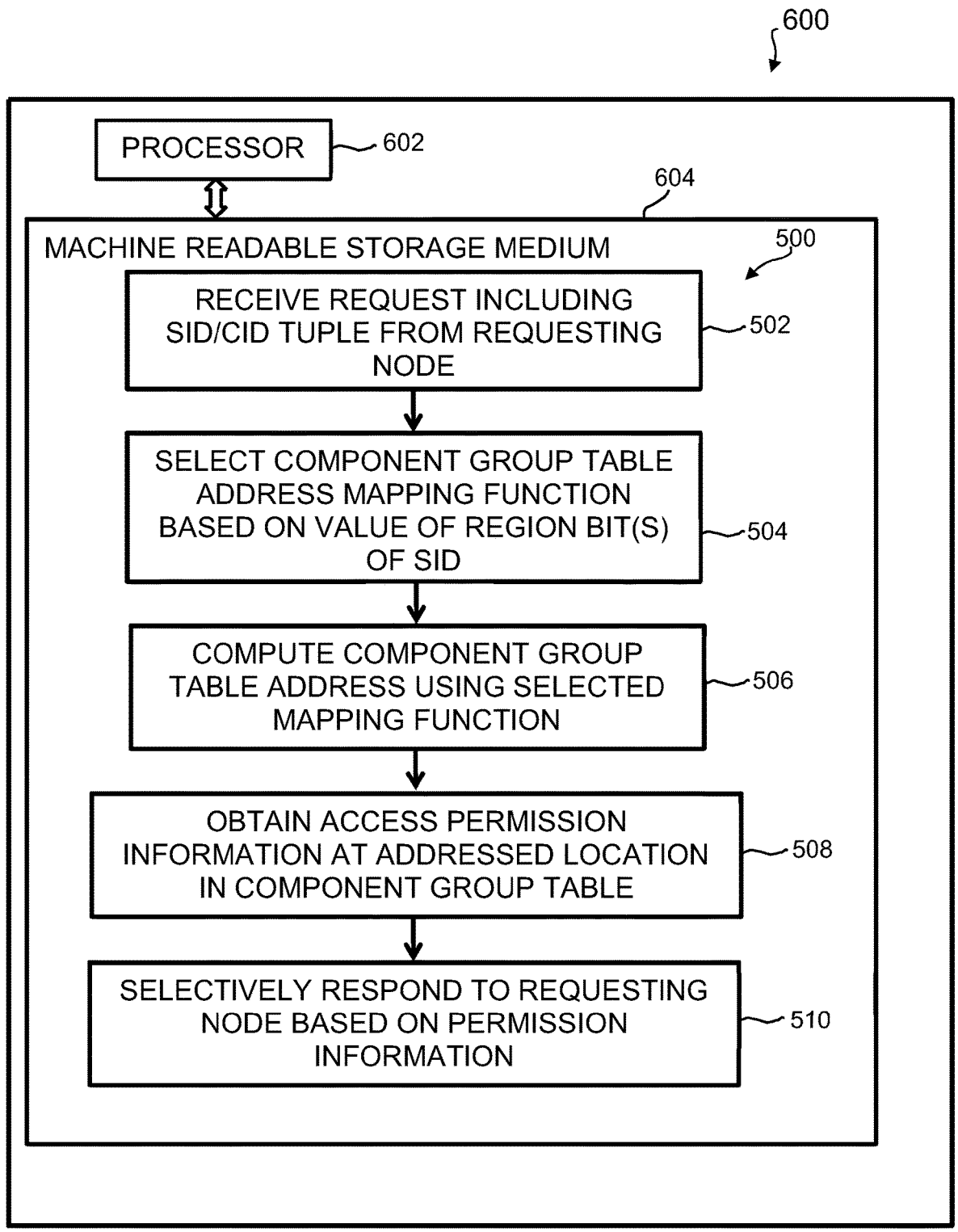
FIG. 6 is a block diagram of a network node in a computing system, according to one or more examples of the disclosure.

FIG. 6 is a block diagram of a computing resource 600 implementing a method of configuration according to one or more disclosed examples. Computing device 600 includes at least one hardware processor 602 and a machine readable storage medium 604. As illustrated, machine readable storage medium 604 may store instructions, that when executed by hardware processor 602 (either directly or via emulation/virtualization), cause hardware processor 602 to perform one or more disclosed methods in the system memory of a computing resource. In this example, the instructions stored reflect the method 500 described herein with reference to FIG. 5.

Examples in the present disclosure may be directed to a non-transitory computer-readable medium storing computer-executable instructions and executable by one or more processors of the computer via which the computer-readable medium is accessed. A computer-readable media may be any available media that may be accessed by a computer. By way of example, such computer-readable media may comprise random access memory (RAM), read-only memory (ROM), electrically-erasable/programmable read-only memory (EEPROM), compact disc ROM (CD-ROM) or other optical disk storage, magnetic disk storage or other magnetic storage devices, or any other medium that may be used to carry or store desired program code in the form of instructions or data structures and that may be accessed by a computer. Disk and disc, as used herein, includes compact disc ("CD"), laser disc, optical disc, digital versatile disc ("DVD"), floppy disk and Blu-ray® disc where disks usually reproduce data magnetically, while discs reproduce data optically with lasers.

Note also that the software implemented aspects of the subject matter hereof are usually encoded on some form of program storage medium or implemented over some type of transmission medium. The program storage medium is a non-transitory medium and may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The claimed subject matter is not limited by these aspects of any given implementation.

The foregoing description, for purposes of explanation, used specific nomenclature to provide a thorough understanding of the disclosure. However, it will be apparent to one skilled in the art that the specific details are not required in order to practice the systems and methods described herein. The foregoing descriptions of specific examples are presented for purposes of illustration and description. They are not intended to be exhaustive of or to limit this disclosure to the precise forms described. Many modifications and variations are possible in view of the above teachings. The examples are shown and described in order to best explain the principles of this disclosure and practical applications, to thereby enable others skilled in the art to best utilize this disclosure and various examples with various modifications as are suited to the particular use contemplated. It is intended that the scope of this disclosure be defined by the claims and their equivalents below.

What is claimed is:

1. A method for accessing a component group table entry corresponding to a requesting node in a network, comprising:
receiving at a receiving node in the network an identifier identifying the requesting node;
determining a component group table address for the requesting node using a first mapping function when the identifier has a value in a first address range and using a second mapping function when the identifier has a value in a second address range; and
accessing a location in the component group table identified by the determined component group table address.

2. The method of claim 1, wherein the identifier comprises a tuple including a subnet identifier (SID) and a component identifier (CID).

3. The method of claim 1, wherein the first and second mapping functions define at least two address regions in the component group table.

4. The method of claim 3, wherein a first address region in the component group table accommodates a first plurality of subnets each having a first maximum number of components and a second address region in the component group table accommodates a second plurality of subnets each having a second maximum number of components.

5. The method of claim 1, wherein the identifier tuple is included in an Internet Protocol (IP) address for the requesting node.

6. The method of claim 2, wherein first mapping function is expressed as:

$$LOW\ \text{REGION ADDRESS} = (SID - SID\_LOW\_BASE) \times CID\_PER\_\text{SUBNET}\_LOW + CID[11:0]$$

where SID_LOW_BASE is the base SID value of the first region and LOW_CID_64_NUMBER is specified to minimize sparseness in the first region;

and wherein the second mapping function is expressed as:

HIGH REGION ADDRESS=($SID-SID\_HIGH\_BASE$)×$CID\_PER$_SUBNET_HIGH+$CID$[11:0]+$CGP$_HIGH_OFFSET where SID_HIGH_BASE is the base SID value of the second region and CID_PER_SUBNET_HIGH is specified to minimize sparseness in the second region and where CGP_HIGH_OFFSET is an address boundary between the first region and the second region.

7. The method of claim 4, wherein the first plurality of subnets is comprised of computing nodes and the second plurality of subnets is comprised of storage nodes.

8. A network node, comprising:
a network interface for coupling the network node to a network;
a memory storing a component group table containing access permission information for a plurality of nodes coupled to the network;
wherein:
the network node is responsive to an identifier received from a requesting node via the network interface to compute a component group table address corresponding to the requesting node; and
the network node computes the component table address according to a first mapping function when the identifier has a first value in a first address range and according to a second mapping function when the identifier has a second value in a second address range; and
accessing a location in the component group table identified by the computed component group table address to determine access permission for the requesting node.

9. The network node of claim 8, wherein the identifier comprises a tuple including a subnet identifier and a component identifier.

10. The network node of claim 8, wherein the first and second mapping functions define at least two address regions in the component group table.

11. The network node of claim 10, wherein a first address region in the component group table accommodates a first plurality of subnets each having a first maximum number of components and a second address region in the component group table accommodates a second plurality of subnets each having a second maximum number of components.

12. The network node of claim 9, wherein the identifier tuple is included in an Internet Protocol (IP) address for the requesting node.

13. The network node of claim 8, wherein first mapping function is expressed as:

LOW REGION ADDRESS=($SID-SID\_LOW\_BASE$)×$CID\_PER$_SUBNET_LOW+$CID$[11:0]

where SID_LOW is the base SID value of the first region and CID_PER_SUBNET_LOW is specified to minimize sparseness in the first region;

and wherein the second mapping function is expressed as:

HIGH REGION ADDRESS=($SID-SID\_HIGH\_BASE$)×$CID\_PER$_SUBNET_HIGH+$CID$[11:0]+$CGP$_HIGH_OFFSET where SID_HIGH is the base SID value of the second region and CID_PER_SUBNET_HIGH is specified to minimize sparseness in the second region and where CGP_HIGH_OFFSET is an address boundary between the first region and the second region.

14. The network node of claim 11, wherein the first plurality of subnets is comprised of computing nodes and the second plurality of subnets is comprised of storage nodes.

15. A non-transitory computer-readable medium tangibly embodying instructions executable by a hardware processor to:
receive an identifier tuple comprising a subnet identifier and a component identifier identifying a requesting node;
compute a component group table address for the requesting node according to a first mapping function when the subnet identifier has a value in a first range and according to a second mapping function when the subnet identifier has a value in a second range; and
access a location in the component group table identified by the computed component group table address.

16. The non-transitory computer-readable medium of claim 15, wherein the location in the component group table identified by the component group table address stores access permission information for the requesting node.

17. The non-transitory computer-readable medium of claim 16, wherein the first and second mapping functions define at least two address regions in the component group table.

18. The non-transitory computer-readable medium of claim 17, wherein a first address region in the component group table accommodates a first plurality of subnets each having a first maximum number of components and a second address region in the component group table accommodates a second plurality of subnets each having a second maximum number of components.

19. The non-transitory computer-readable medium of claim 15, wherein the identifier tuple is included in an Internet Protocol (IP) address for the requesting node.

20. The non-transitory computer-readable medium of claim 18, wherein the first plurality of subnets is comprised of computing nodes and the second plurality of subnets is comprised of storage nodes.

* * * * *